(12) United States Patent
Kamila et al.

(10) Patent No.: US 12,565,306 B2
(45) Date of Patent: Mar. 3, 2026

(54) VARIABLE SLAT DISPLACEMENT USING SPANWISE ACTUATOR

(71) Applicant: The Boeing Company, Arlington, VA (US)

(72) Inventors: Eric S. Kamila, Tukwila, WA (US);
Ramon A. Burin, Seattle, WA (US);
John A. Standley, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/243,328

(22) Filed: Sep. 7, 2023

(65) Prior Publication Data

US 2025/0083801 A1      Mar. 13, 2025

(51) Int. Cl.
| | |
|---|---|
| *B64C 9/22* | (2006.01) |
| *B64C 9/02* | (2006.01) |
| *B64C 13/40* | (2006.01) |
| *F15B 15/14* | (2006.01) |

(52) U.S. Cl.
CPC .................. *B64C 9/22* (2013.01); *B64C 9/02* (2013.01); *B64C 13/40* (2013.01); *F15B 15/14* (2013.01)

(58) Field of Classification Search
CPC .................................. B64C 13/28; B64C 9/22
See application file for complete search history.

(56) References Cited

U.S. PATENT DOCUMENTS

| | | | |
|---|---|---|---|
| 4,445,655 A | 5/1984 | Hueberger | |
| 4,470,569 A * | 9/1984 | Shaffer ..................... | B64C 9/22 |
| | | | 244/214 |
| 5,056,741 A | 10/1991 | Bliesner et al. | |
| 5,836,550 A * | 11/1998 | Paez ......................... | B64C 9/22 |
| | | | 244/214 |
| 8,517,314 B2 * | 8/2013 | Kracke ..................... | B64C 9/22 |
| | | | 244/99.3 |

(Continued)

FOREIGN PATENT DOCUMENTS

| | | | | |
|---|---|---|---|---|
| CN | 104477372 A | * | 4/2015 | |
| CN | 111674542 A | * | 9/2020 | ............... B64C 9/02 |

(Continued)

OTHER PUBLICATIONS

Campbell-Brennan, Jahee. (Mar. 7, 2022). "Rising Rate Suspension: A Design Guide" Wavey Dynamics. https://https://www.waveydynamics.com/post/rising-rate-suspension (Year: 2022).*

(Continued)

*Primary Examiner* — Richard Green
(74) *Attorney, Agent, or Firm* — Hanley, Flight & Zimmerman, LLC

(57)        ABSTRACT

An aircraft wing includes a fixed structure and a linear hydraulic slat actuator attached to the fixed structure. The linear hydraulic slat actuator is oriented spanwise along the aircraft wing. The aircraft wing also includes an actuator output link and a slat attached to the actuator output link. The aircraft wing also includes a bell-crank coupled to the linear hydraulic slat actuator and to the actuator output link. In response to spanwise movement of the linear hydraulic slat actuator, the bell-crank is configured to move the actuator output link in a different direction that enables the slat to move between a retracted position and an extended position.

19 Claims, 9 Drawing Sheets

(56)                    References Cited

U.S. PATENT DOCUMENTS

| | | |
|---|---|---|
| 11,433,988 B2 | 9/2022 | Godfroid |
| 2010/0187368 A1 | 7/2010 | Cathelain et al. |

FOREIGN PATENT DOCUMENTS

| | | | | |
|---|---|---|---|---|
| DE | 1756515 A1 | 10/1970 | | |
| EP | 0909705 A2 | 4/1999 | | |
| WO | WO-2012099300 A1 * | 7/2012 | ............. | B64C 13/36 |

OTHER PUBLICATIONS

European Patent Office, "Extended European Search Report," issued Jan. 29, 2025 in connection with European Patent Application No. 24191530.5, 3 pages.

European Patent Office, "Extended European Search Report," issued Mar. 20, 2025 in connection with European Patent Application No. 24215049.8, 7 pages.

United States Patent and Trademark Office, "Non-Final Office Action," issued Nov. 22, 2024 in connection with U.S. Appl. No. 18/533,603, 17 pages.

* cited by examiner

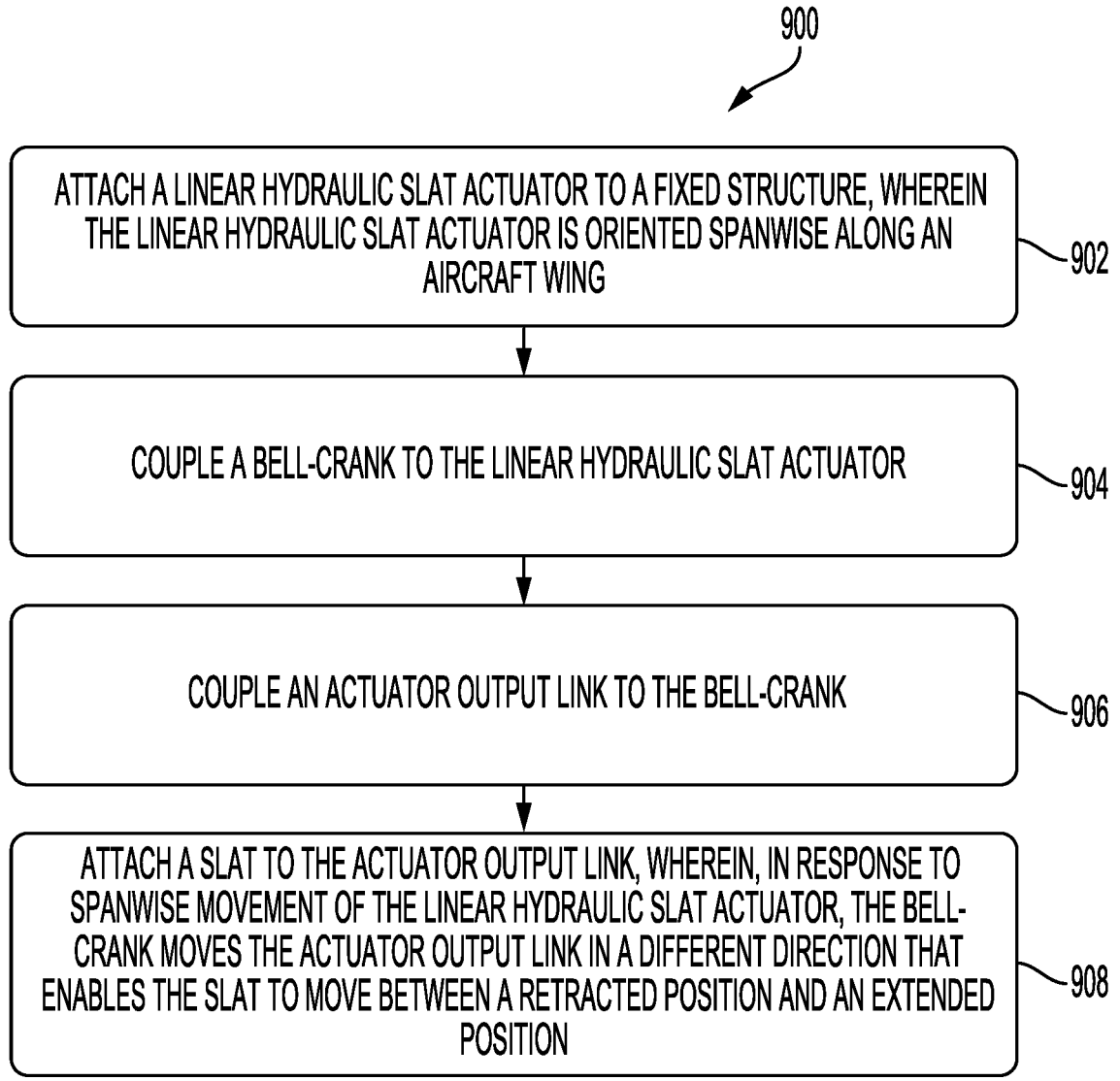

900

ATTACH A LINEAR HYDRAULIC SLAT ACTUATOR TO A FIXED STRUCTURE, WHEREIN THE LINEAR HYDRAULIC SLAT ACTUATOR IS ORIENTED SPANWISE ALONG AN AIRCRAFT WING ~902

COUPLE A BELL-CRANK TO THE LINEAR HYDRAULIC SLAT ACTUATOR ~904

COUPLE AN ACTUATOR OUTPUT LINK TO THE BELL-CRANK ~906

ATTACH A SLAT TO THE ACTUATOR OUTPUT LINK, WHEREIN, IN RESPONSE TO SPANWISE MOVEMENT OF THE LINEAR HYDRAULIC SLAT ACTUATOR, THE BELL-CRANK MOVES THE ACTUATOR OUTPUT LINK IN A DIFFERENT DIRECTION THAT ENABLES THE SLAT TO MOVE BETWEEN A RETRACTED POSITION AND AN EXTENDED POSITION ~908

FIG. 9

VARIABLE SLAT DISPLACEMENT USING SPANWISE ACTUATOR

FIELD

The present disclosure generally relates to aircraft wings, and more particularly, to an actuator that displaces a slat of an aircraft wing.

BACKGROUND

This background description is provided for the purpose of generally presenting the context of the disclosure. Unless otherwise indicated herein, material described in this section is neither expressly nor impliedly admitted to be prior art to the present disclosure or the appended claims.

In order to decrease the amount of drag associated with flying an aircraft, aircraft wings are manufactured to be relatively thin. However, as aircraft wings become thinner, it has become increasingly difficult to package different components into aircraft wings. As a non-limiting example, as aircraft wing airfoils get smaller, it has become more difficult to fit linear hydraulic slat actuators into an aircraft wing leading edge. Small aircraft wing airfoils typically require a penetration in a front spar web to accommodate the length of a linear hydraulic slat actuator. However, in these scenarios, actuator displacement is severely limited.

SUMMARY

The present application is directed to a spanwise-oriented linear hydraulic slat actuator that utilizes a bell-crank to achieve variable output displacement. For example, the linear hydraulic slat actuator can be coupled to a fixed structure of an aircraft wing. The linear hydraulic slat actuator is oriented spanwise along the aircraft wing. The bell-crank is coupled to the linear hydraulic slat actuator and to an actuator output link. For example, a first arm of the bell-crank is coupled to the linear hydraulic slat actuator, and a second arm of the bell crank is coupled to the actuator output link. The linear hydraulic slat actuator drives the first arm of the bell-crank using spanwise movement and, as a result, the second arm of the bell-crank moves the actuator output link in a different direction that enables a slat of the aircraft wing to move between a retracted position and an extended position. For example, the slat of the aircraft wing is attached to the actuator output link. By driving the first arm of the bell-crank with the linear hydraulic slat actuator, the second arm of the bell-crank can displace the actuator output link in such a manner that the attached slat retracts or extends.

Thus, by using the bell-crank to move the actuator output link in a different direction (e.g., a chordwise direction) than the spanwise movement of the linear hydraulic slat actuator, the linear hydraulic slat actuator can be oriented in spanwise direction along the aircraft wing. As a result of the spanwise orientation, the linear hydraulic slat actuator can achieve greater displacement within an aircraft wing architecture while occupying less space in the movement direction of the slat (e.g., the chordwise direction). As a result, penetration of front spar web in the aircraft wing can be bypassed. Additionally, for a fixed displacement linear hydraulic slat actuator, the output displacement of the actuator output link, and thus the attached slat, can be tailored via arm lengths of the bell-crank.

In one aspect, the present application discloses an aircraft wing. The aircraft wing includes a fixed structure and a linear hydraulic slat actuator attached to the fixed structure. The linear hydraulic slat actuator is oriented spanwise along the aircraft wing. The aircraft wing also includes an actuator output link and a slat attached to the actuator output link. The aircraft wing also includes a bell-crank coupled to the linear hydraulic slat actuator and to the actuator output link. In response to spanwise movement of the linear hydraulic slat actuator, the bell-crank is configured to move the actuator output link in a different direction that enables the slat to move between a retracted position and extended positions.

In another aspect, the present application discloses a method of fabricating an aircraft wing. The method includes attaching a linear hydraulic slat actuator to a fixed structure. The linear hydraulic slat actuator is oriented spanwise along the aircraft wing. The method also includes coupling a bell-crank to the linear hydraulic slat actuator and coupling an actuator output link to the bell-crank. The method also includes attaching a slat to the actuator output link. In response to spanwise movement of the linear hydraulic slat actuator. The bell-crank moves the actuator output link in a different direction that enables the slat to move between a retracted position and extended positions.

In another aspect, the present application discloses an aircraft. The aircraft includes a fuselage and an aircraft wing attached to the fuselage. The aircraft wing includes a fixed structure and a linear hydraulic slat actuator attached to the fixed structure. The linear hydraulic slat actuator is oriented spanwise along the aircraft wing. The aircraft wing also includes an actuator output link and a slat attached to the actuator output link. The aircraft wing also includes a bell-crank coupled to the linear hydraulic slat actuator and to the actuator output link. In response to spanwise movement of the linear hydraulic slat actuator, the bell-crank is configured to move the actuator output link in a different direction that enables the slat to move between a retracted position and extended positions.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

FIG. 9 is a flowchart of an example of an implementation of a method, according to an exemplary embodiment.

DETAILED DESCRIPTION

Figure 1:
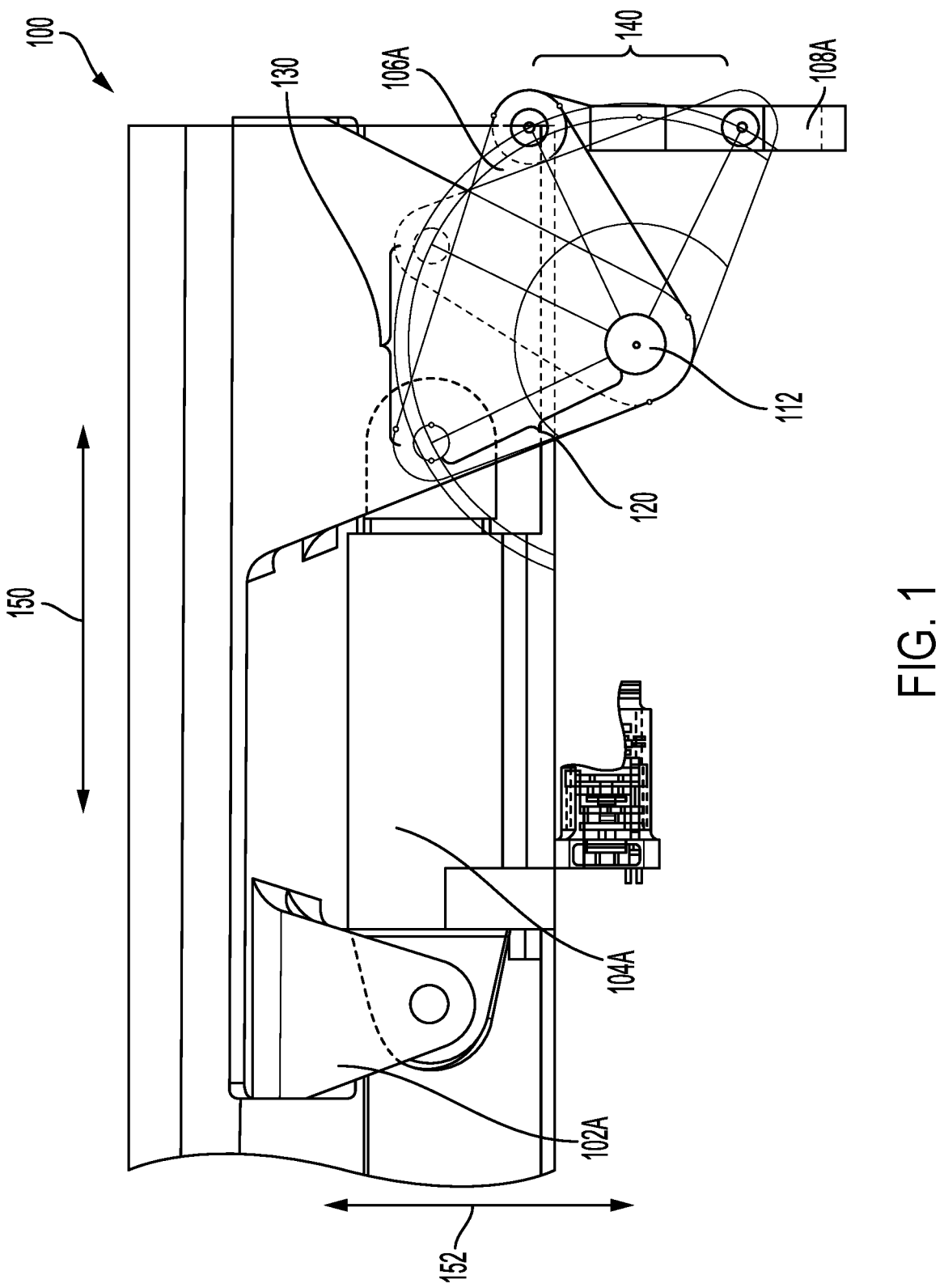
FIG. 1 illustrates a first view of a portion of an aircraft wing with a spanwise-oriented linear hydraulic slat actuator, according to an exemplary embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, linear hydraulic slat actuator are illustrated and associated with reference number 104. When referring to a particular one of the linear hydraulic slat actuator, such as the linear hydraulic slat actuator 104A, the distinguishing letter "A" is used. However, when referring to any arbitrary one of the linear hydraulic slat actuator or to the linear hydraulic slat actuator as a group, the reference number 104 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring to FIG. 1, a first view of a portion of an aircraft wing 100 with a spanwise-oriented linear hydraulic slat actuator is illustrated, in accordance with an exemplary embodiment.

The aircraft wing 100 includes a fixed structure 102A. In FIG. 1, the fixed structure 102A corresponds to a support rib. However, in other embodiments, the fixed structure 102A can correspond to a front spar or a beam. A linear hydraulic slat actuator 104A is attached to the fixed structure 102A. The linear hydraulic slat actuator 104A is oriented spanwise 150 along the aircraft wing 100. For example, the linear hydraulic slat actuator 104A is oriented in such a manner that a first end of the linear hydraulic slat actuator 104A is pointing towards a fuselage, and a second end of the linear hydraulic slat actuator 104A is pointing towards a wing tip of the aircraft wing 100.

A bell-crank 106A is coupled to the linear hydraulic slat actuator 104A and to an actuator output link 108A. In the embodiment illustrated in FIG. 1, the fixed structure 102A is also coupled to the bell-crank 106A. In the embodiment illustrated in FIG. 1, the fixed structure 102A can correspond to a support rib coupled to a pivot point 112 of the bell-crank 106A and to the linear hydraulic slat actuator 104A.

The bell-crank 106A includes a first arm coupled to the linear hydraulic slat actuator 104A and a second arm coupled to the actuator output link 108A. A first length of the first arm defines a first bell-crank radius (e.g., the bell-crank radius 120 in FIG. 1), and a second length of the second arm defines a second bell-crank radius (e.g., the bell-crank radius 120). In the embodiment of FIG. 1, the first length of the first arm is similar to (e.g., equal to) the second length of the second arm, thus the first bell-crank radius is similar to the second bell-crank radius. However, in other embodiments, as described with respect to FIG. 8, the first bell-crank radius can be different from the second bell-crank radius.

An input stroke length 130 associated with the linear hydraulic slat actuator 104A is based on the first bell-crank radius (e.g., the bell-crank radius 120 in FIG. 1). The input stroke length 130 corresponds to a distance the linear hydraulic slat actuator 104A travels (e.g., expands or compresses). An output stroke length 140 associated with the actuator output link 108A is based on the second bell-crank radius (e.g., the bell-crank radius 120 in FIG. 1). The output stroke length 140 corresponds to a distance the actuator output link 108A travels (e.g., moves). In some embodiments, as described in greater detail with respect to FIG. 8, the second bell-crank radius is greater than the first bell-crank radius, which results in the output stroke length 140 being greater than the input stroke length 130. In these embodiments, a smaller output stroke would result in a large linear hydraulic slat actuator movement, which in turn would cause a smaller slat movement.

Figure 7:
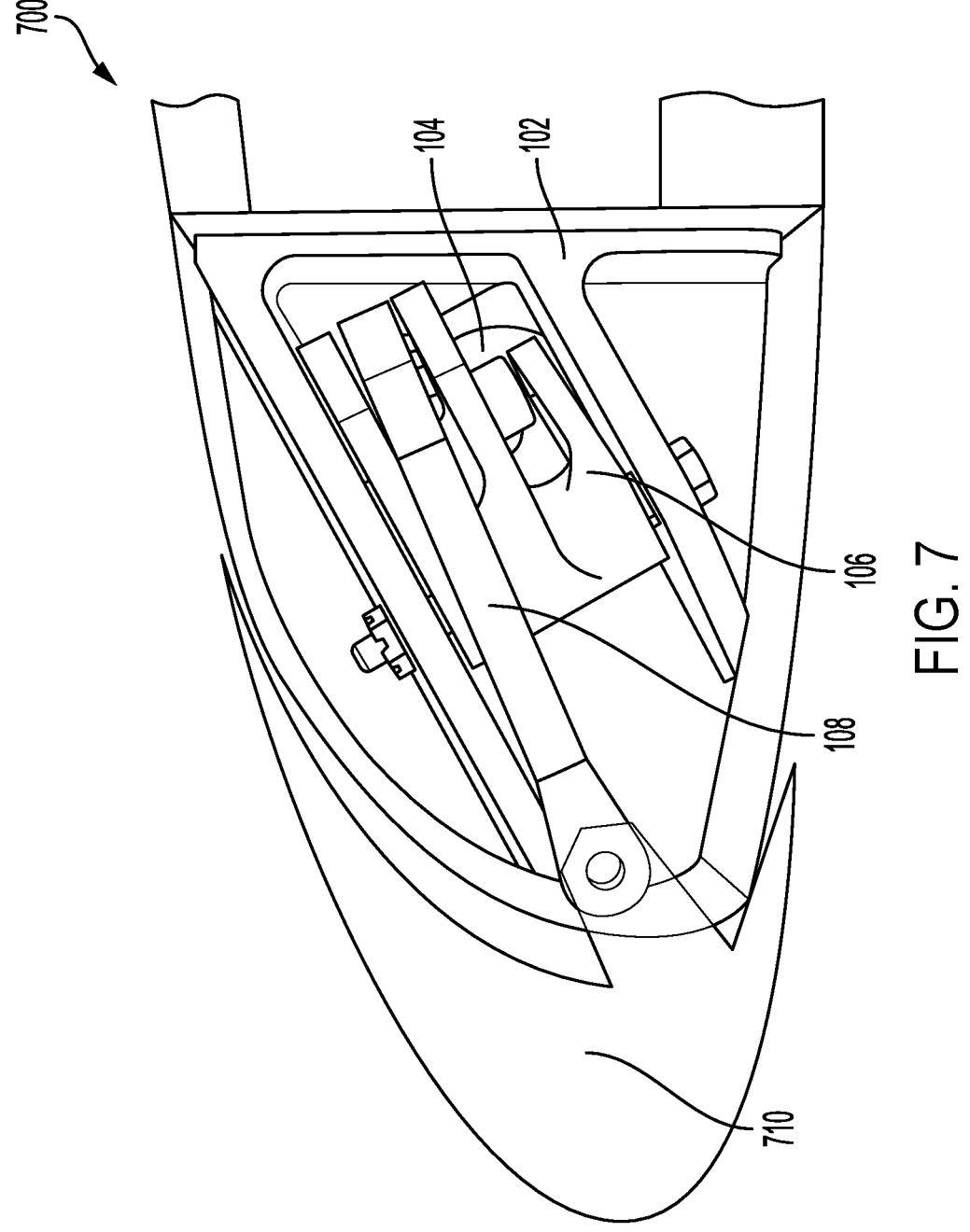
FIG. 7 illustrates a bell-crank operable to move an actuator output link and a slat in a chordwise direction in response to spanwise movement from a linear hydraulic slat actuator, according to an exemplary embodiment.

In response to spanwise 150 movement of the linear hydraulic slat actuator 104A, the bell-crank 106A can be configured to move the actuator output link 108A in a different direction (e.g., a chordwise 152 direction) that enables a slat, such as the slat 710 of FIG. 7, attached to the actuator output link 108A to move between a retracted position and an extended position.

Thus, by using the bell-crank 106A to move the actuator output link 108A in a different direction (e.g., the chordwise 152 direction) than the spanwise 150 movement of the linear hydraulic slat actuator 104A, the linear hydraulic slat actuator 104A can be oriented in the spanwise 150 direction along the aircraft wing 100. As a result of the spanwise 150 orientation, the linear hydraulic slat actuator 104A can achieve greater displacement within the aircraft wing 100 while occupying less space in the movement direction of the slat (e.g., the chordwise 152 direction). Additionally, for a fixed displacement linear hydraulic slat actuator 104A, the output displacement of the actuator output link 108A, and thus the attached slat (e.g., the slat 710 of FIG. 7), can be tailored via arm lengths of the bell-crank 106A.

Figure 2:
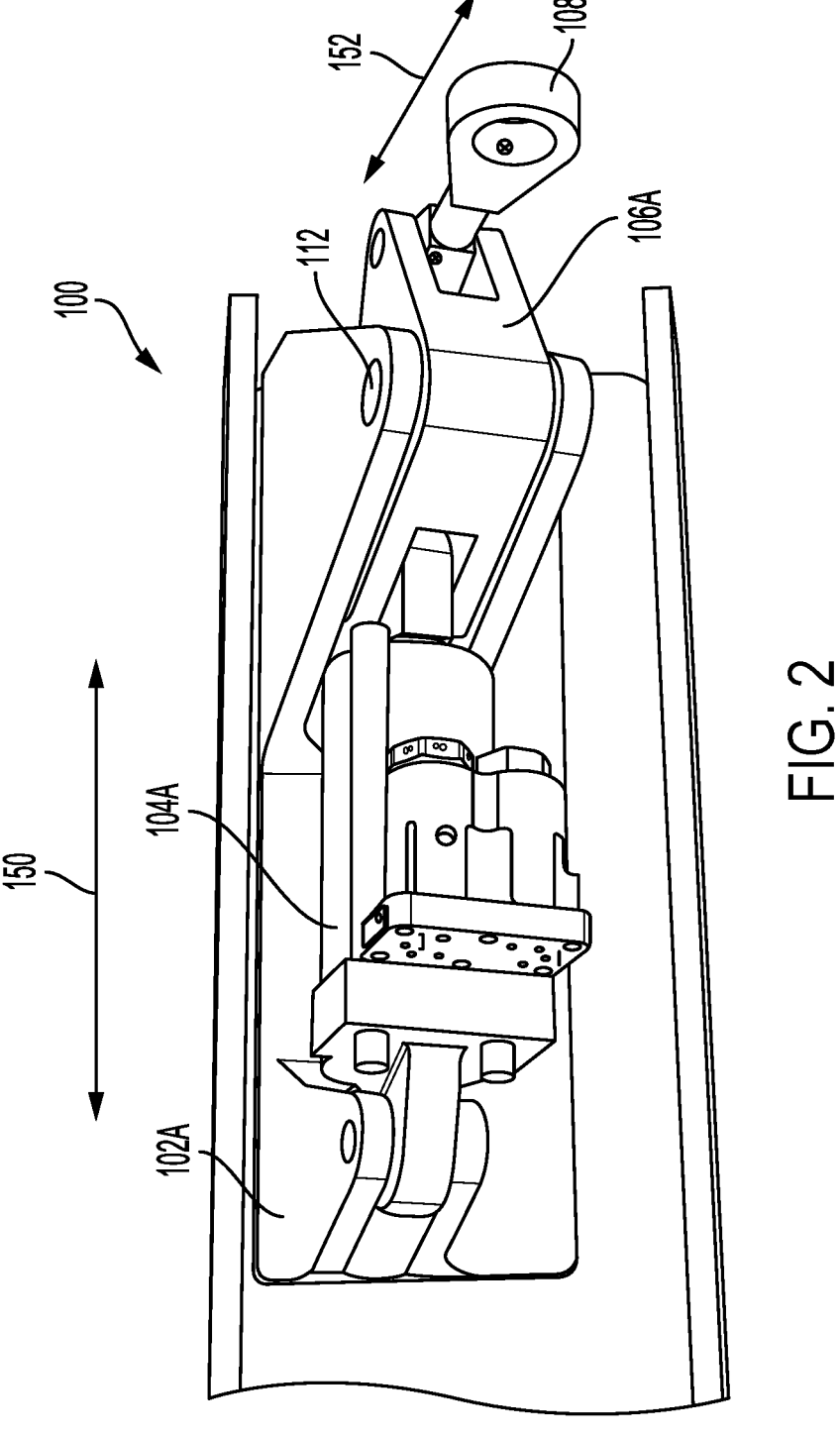
FIG. 2 illustrates a second view of the portion of the aircraft wing with the spanwise-oriented linear hydraulic slat actuator, according to an exemplary embodiment.

Referring to FIG. 2, a second view of the portion of the aircraft wing 100 with the spanwise-oriented linear hydraulic slat actuator is illustrated, in accordance with an exemplary embodiment. In particular, FIG. 2 depicts a view from underneath the linear hydraulic slat actuator 104A.

The aircraft wing 100 includes the fixed structure 102A and the linear hydraulic slat actuator 104A attached to the fixed structure 102A. The linear hydraulic slat actuator 104A is oriented spanwise 150 along the aircraft wing 100. The aircraft wing 100 also includes the bell-crank 106A coupled to the linear hydraulic slat actuator 104A and to the actuator output link 108A.

In response to spanwise 150 movement of the linear hydraulic slat actuator 104A, the bell-crank 106A can be configured to move the actuator output link 108A in a different direction (e.g., a chordwise 152 direction) that enables the slat 710 attached to the actuator output link 108A to move between a retracted position and an extended position.

Thus, by using the bell-crank 106A to move the actuator output link 108A in a different direction (e.g., the chordwise 152 direction) than the spanwise 150 movement of the linear hydraulic slat actuator 104A, the linear hydraulic slat actuator 104A can be oriented in the spanwise 150 direction along the aircraft wing 100. As a result of the spanwise 150 orientation, the linear hydraulic slat actuator 104A can achieve greater displacement within the aircraft wing 100 while occupying less space in the movement direction of the slat (e.g., the chordwise 152 direction). Additionally, for a fixed displacement linear hydraulic slat actuator 104A, the output displacement of the actuator output link 108A, and thus the attached slat (e.g., the slat 710 of FIG. 7), can be tailored via arm lengths of the bell-crank 106A.

Figure 3:
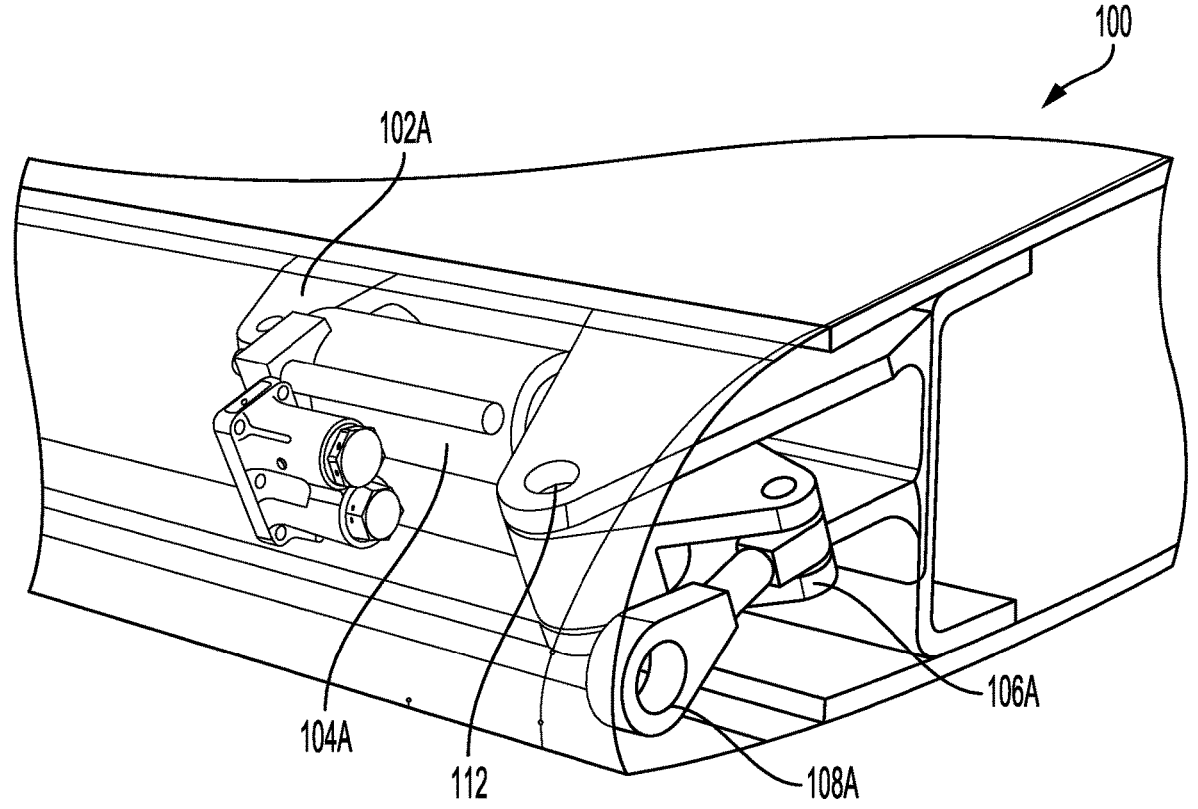
FIG. 3 illustrates a third view of the portion of the aircraft wing with the spanwise-oriented linear hydraulic slat actuator, according to an exemplary embodiment.

Referring to FIG. 3, a third view of the portion of the aircraft wing 100 with the spanwise-oriented linear hydraulic slat actuator is illustrated, in accordance with an exemplary embodiment. In particular, FIG. 3 depicts a side view of the actuator output link 108A.

In a similar manner as described with respect to FIGS. 1-2, in response to spanwise 150 movement of the linear hydraulic slat actuator 104A, the bell-crank 106A can be configured to move the actuator output link 108A in a different direction (e.g., a chordwise 152 direction) that enables a slat (not shown) attached to the actuator output link 108A to move between a retracted position and an extended position.

Figure 4:
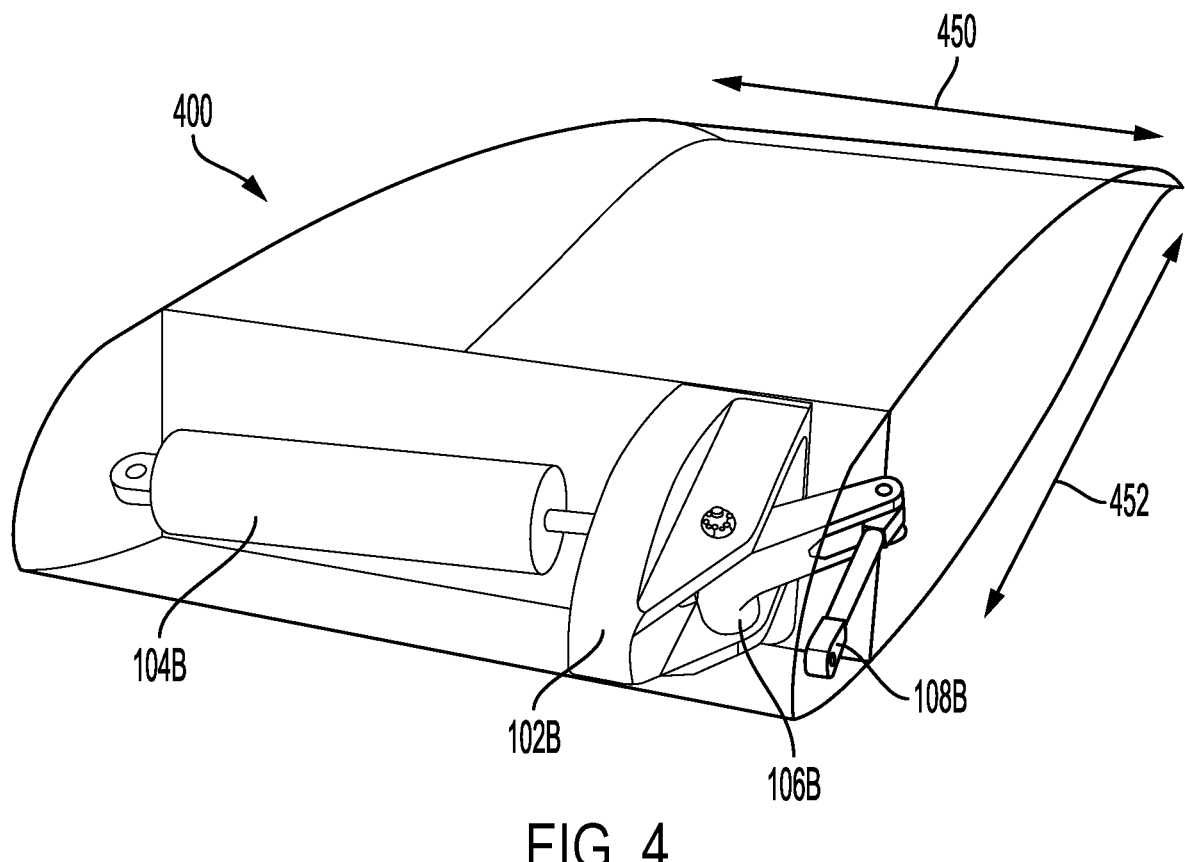
FIG. 4 illustrates a first view of a portion of a second aircraft wing with a spanwise-oriented linear hydraulic slat actuator, according to an exemplary embodiment.

Referring to FIG. 4, a first view of a portion of an aircraft wing 400 with a spanwise-oriented linear hydraulic slat actuator is illustrated, in accordance with an exemplary embodiment.

The aircraft wing 400 includes a fixed structure 102B. In FIG. 4, the fixed structure 102B corresponds to a support rib for a bell-crank 106B. A linear hydraulic slat actuator 104B is oriented spanwise 450 along the aircraft wing 400. For example, the linear hydraulic slat actuator 104B is oriented in such a manner that a first end of the linear hydraulic slat actuator 104B is pointing towards a fuselage, and a second end of the linear hydraulic slat actuator 104B is pointing towards a wing tip of the aircraft wing 400.

The bell-crank 106B is coupled to the linear hydraulic slat actuator 104A and to an actuator output link 108B. In response to spanwise 450 movement of the linear hydraulic slat actuator 104B, the bell-crank 106B can be configured to move the actuator output link 108B in a different direction (e.g., a chordwise 452 direction) that enables a slat, such as the slat 710 of FIG. 7, attached to the actuator output link 108B to move between a retracted position and an extended position.

Thus, by using the bell-crank 106B to move the actuator output link 108B in a different direction (e.g., the chordwise 452 direction) than the spanwise 450 movement of the linear hydraulic slat actuator 104B, the linear hydraulic slat actuator 104B can be oriented in the spanwise 450 direction along the aircraft wing 400. As a result of the spanwise 450 orientation, the linear hydraulic slat actuator 104B can achieve greater displacement within the aircraft wing 400 while occupying less space in the movement direction of the slat (e.g., the chordwise 452 direction).

Figure 5:
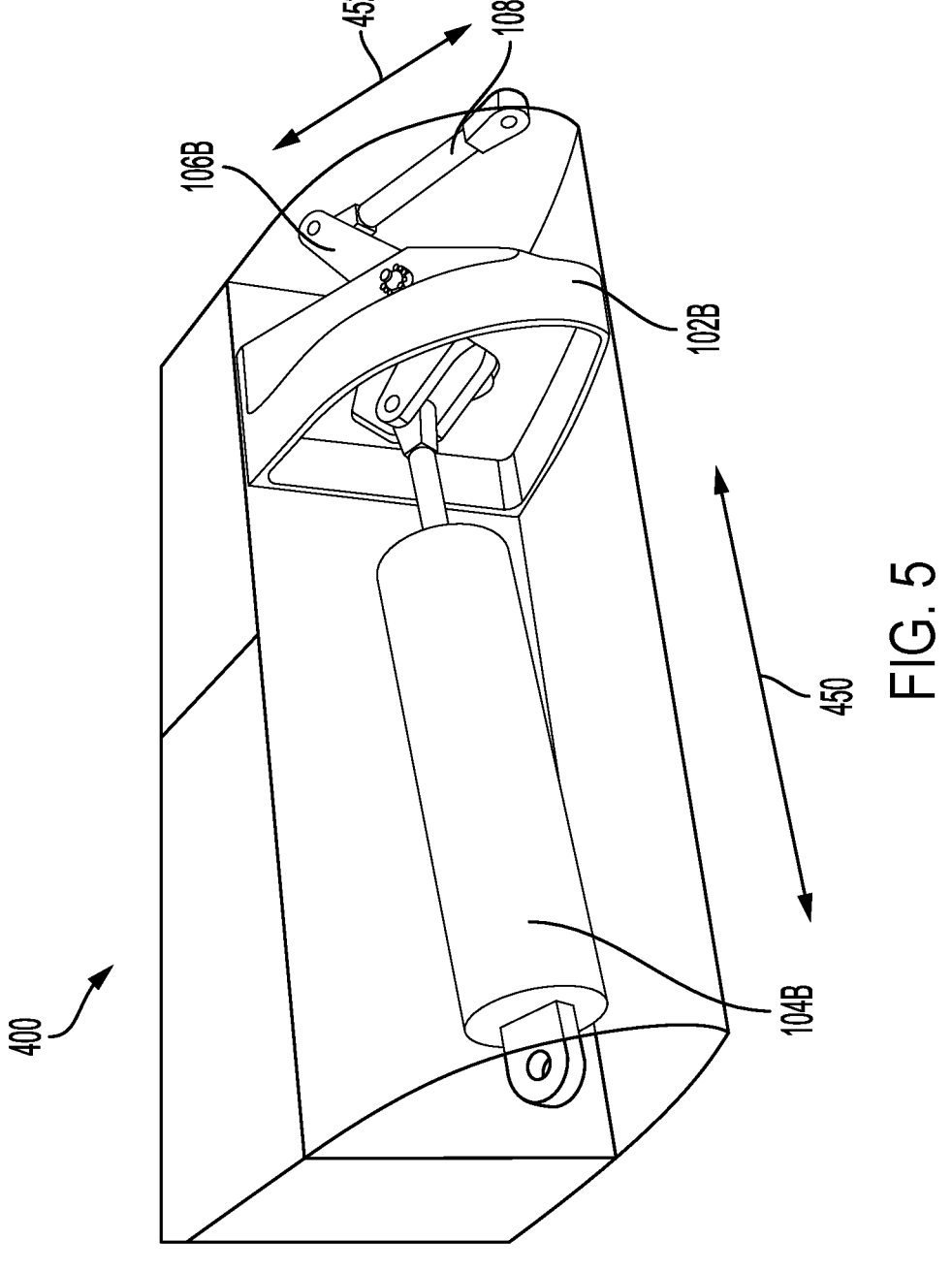
FIG. 5 illustrates a second view of the portion of the second aircraft wing with the spanwise-oriented linear hydraulic slat actuator, according to an exemplary embodiment.

Referring to FIG. 5, a second view of the portion of the aircraft wing 400 with the spanwise-oriented linear hydraulic slat actuator is illustrated, in accordance with an exemplary embodiment. In particular, FIG. 5 depicts a side view of the actuator output link 108B.

In a similar manner as described with respect to FIG. 4, in response to spanwise 450 movement of the linear hydraulic slat actuator 104B, the bell-crank 106B can be configured to move the actuator output link 108B in a different direction (e.g., a chordwise 452 direction) that enables a slat (not shown) attached to the actuator output link 108B to move between a retracted position and an extended position.

Figure 6:
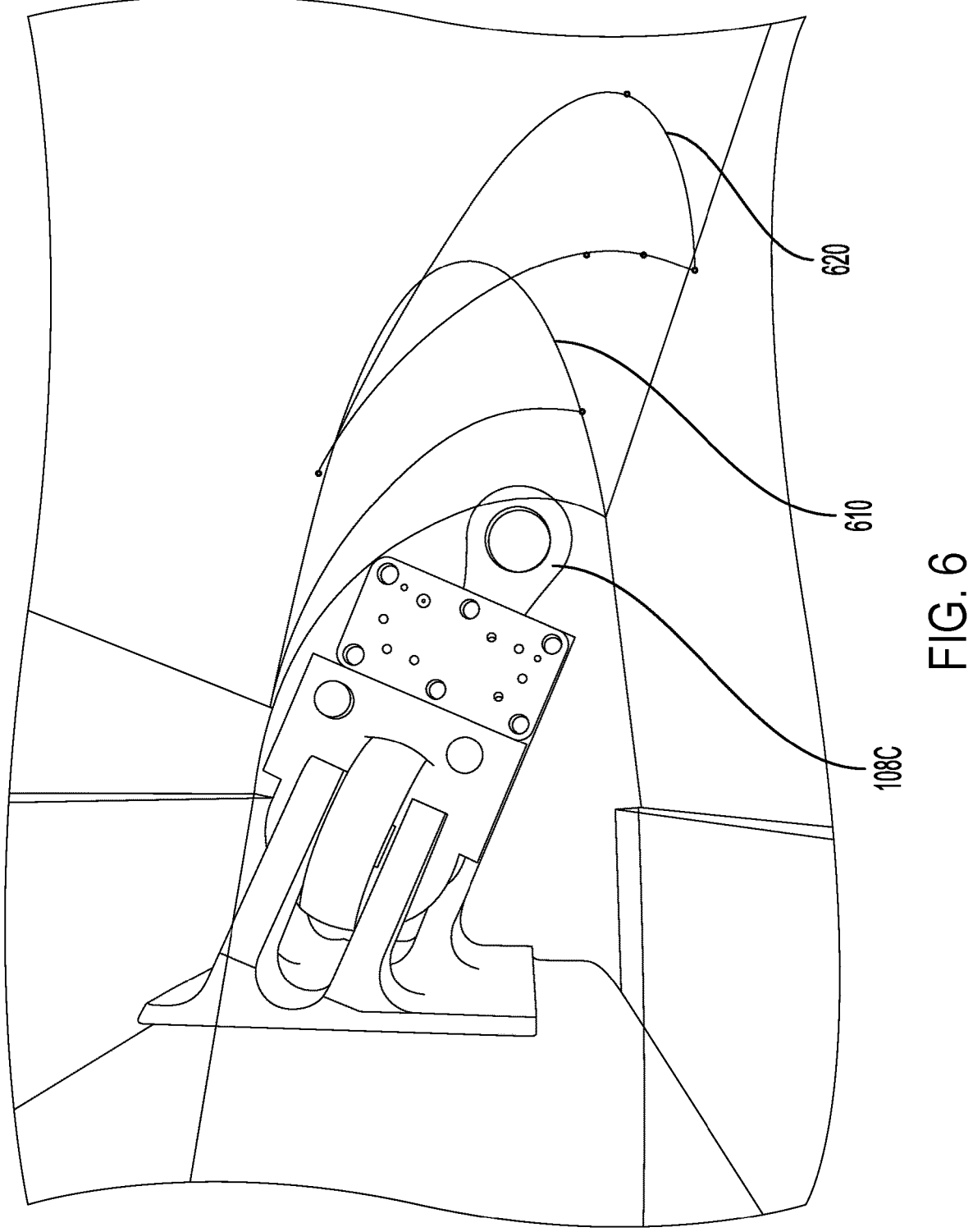
FIG. 6 illustrates an actuator output link operable to extend a slat between a retracted position and an extended position based on spanwise movement from a linear hydraulic slat actuator, according to an exemplary embodiment.

Referring to FIG. 6, an actuator output link 108C operable to extend a slat between a retracted position and an extended position based on spanwise movement from a linear hydraulic slat actuator is illustrated, in accordance with an exemplary embodiment.

In some embodiments, the actuator output link 108C can correspond to the actuator output link 108A. For example, in some embodiments, the actuator output link 108C can be coupled to the bell-crank 106A and, in response to spanwise 150 movement of the linear hydraulic slat actuator 104A, the bell-crank 106A can be configured to move the actuator output link 108C in a different direction (e.g., a chordwise 152 direction) that enables a slat attached to the actuator output link 108C to move between a retracted position 610 and an extended position 620. In other embodiments, the actuator output link 108C can correspond to the actuator output link 108B. For example, in some embodiments, the actuator output link 108C can be coupled to the bell-crank 106B and, in response to spanwise 450 movement of the linear hydraulic slat actuator 104B, the bell-crank 106B can be configured to move the actuator output link 108C in a different direction (e.g., a chordwise 452 direction) that enables a slat attached to the actuator output link 108C to move between the retracted position 610 and the extended position 620.

Referring to FIG. 7, a bell-crank operable to move an actuator output link and a slat in a chordwise direction in response to spanwise movement from a linear hydraulic slat actuator is illustrated, in accordance with an exemplary embodiment.

In FIG. 7, an aircraft wing 700 includes a fixed structure 102 (e.g., a support rib) and a linear hydraulic slat actuator 104. In some embodiments, the linear hydraulic slat actuator 104 can correspond to the linear hydraulic slat actuator 104A or the linear hydraulic slat actuator 104B. The linear hydraulic slat actuator 104 is oriented spanwise along the aircraft wing 700.

A bell-crank 106 is coupled to the linear hydraulic slat actuator 104 and to the actuator output link 108. In the embodiment illustrated in FIG. 7, the fixed structure 102 is also coupled to the bell-crank 106. In the embodiment illustrated in FIG. 7, the fixed structure 102 can correspond to a support rib coupled to a pivot point of the bell-crank 106.

In response to spanwise movement of the linear hydraulic slat actuator 104, the bell-crank 106 can be configured to move the actuator output link 108 in a different direction (e.g., a chordwise direction) that enables the slat 710 attached to the actuator output link 108C to move between the retracted position 610 and the extended position 620.

Thus, by using the bell-crank 106 to move the actuator output link 108C in a different direction (e.g., the chordwise direction) than the spanwise movement of the linear hydraulic slat actuator 104, the linear hydraulic slat actuator 104 can be oriented in the spanwise direction along the aircraft wing 700. As a result of the spanwise orientation, the linear hydraulic slat actuator 104 can achieve greater displacement within the aircraft wing 700 while occupying less space in the movement direction of the slat (e.g., the chordwise direction). Additionally, for a fixed displacement linear hydraulic slat actuator 104, the output displacement of the actuator output link 108C, and thus the attached slat 710, can be tailored via arm lengths of the bell-crank 106.

Figure 8:
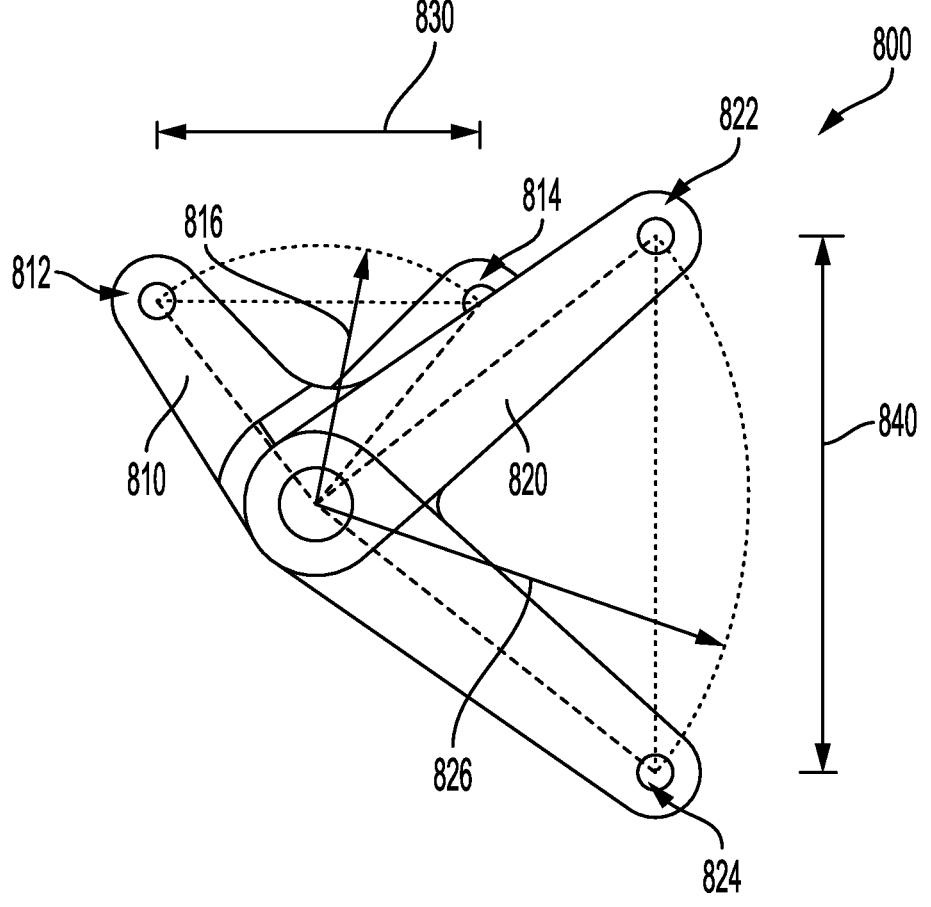
FIG. 8 illustrates a bell-crank, according to an exemplary embodiment.

Referring to FIG. 8, a bell-crank 800 is illustrated, in accordance with an exemplary embodiment. The bell-crank 800 can correspond to the bell-crank 106A, the bell-crank 106B, or the bell-crank 106.

The bell-crank 800 includes a first arm 810 and a second arm 820. The first arm 810 can be coupled to a linear hydraulic slat actuator, such as the linear hydraulic slat actuator 104A, the linear hydraulic slat actuator 104B, or the linear hydraulic slat actuator 104. The second arm 820 can be coupled to an actuator output link, such as the actuator output link 108A, the actuator output link 108B, or the actuator output link 108C. The first arm 810 can be configured to move from a first position 812 to a second position 814 in response to spanwise movement of the linear hydraulic slat actuator, and the second arm 820 can be configured to move from a first position 822 to a second position 824 in response to movement from the first arm 810. For example, when the first arm 810 is in the first position 812, the second arm 820 is in the first position 822. However, when the first arm 810 is in the second position 814, the second arm 820 is in the second position 824.

A first length of the first arm 810 defines a first bell-crank radius 816, and a second length of the second arm 820 defines a second bell-crank radius 826. An input stroke length 830 associated with the hydraulic slat actuator is based on the first bell-crank radius 816, and an output stroke length 840 associated with the actuator output link is based on the second bell-crank radius 826.

The input stroke length 830 corresponds to a distance the linear hydraulic slat actuator 104 travels, and the output stroke length corresponds to a distance the actuator output link 108 travels. As illustrated in FIG. 8, the second bell-crank radius 826 is greater than the first bell-crank radius 816, which results in the output stroke length 840 being greater than the input stroke length 830. As a result, small movement from the linear hydraulic actuator 104 can result in a larger movement from the actuator output link 108. Thus, for a fixed displacement linear hydraulic slat actuator 104, the output displacement of the actuator output link 108, and thus the attached slat 710, can be tailored via arm lengths of the arm 810, 820 of the bell-crank 800.

FIG. 9 illustrates a flow chart of a method 900, according to an exemplary embodiment.

The method 900 includes attaching a linear hydraulic slat actuator to a fixed structure, at block 902. The linear hydraulic slat actuator is oriented spanwise along an aircraft wing. For example, referring to FIG. 1, the linear hydraulic slat actuator 104A is attached to the fixed structure 102A. The linear hydraulic slat actuator 104A is oriented spanwise 150 along the aircraft wing 100.

The method 900 also includes coupling a bell-crank to the linear hydraulic slat actuator, at block 904. For example, referring to FIG. 1, the bell-crank 106A is coupled to the linear hydraulic slat actuator 104A.

The method 900 also includes coupling an actuator output link to the bell-crank, at block 906. For example, referring to FIG. 1, the actuator output link 108A is coupled to the bell-crank 106A.

The method 900 also includes attaching a slat to the actuator output link, at block 908. In response to spanwise movement of the linear hydraulic slat actuator, the bell-crank moves the actuator output link in a different direction that enables the slat to move between a retracted position and an extended positon. For example, referring to FIG. 7, the slat 710 is attached to the actuator output link 108C. In response to spanwise 150, 450 movement of the linear hydraulic slat actuator 104A, 104B, the bell-crank 106A, 106B can be configured to move the actuator output link 108A, 108B, 108C in a different direction (e.g., a chordwise 152 direction) that enables the slat 710 attached to the actuator output link 108A, 108B, 108C to move between the retracted position 610 and the extended position 620. Thus, the linear hydraulic slat actuator 104A, 104B drives the bell-crank 106A, 106B.

According to one implementation of the method 900, the linear hydraulic slat actuator 104A, 104B is coupled to a first arm 810 of the bell-crank 106A, 106B, 800, and the actuator output link 108A, 108B, 108C is coupled to a second arm 820 of the bell-crank 106A, 106B, 800. A first length of the first arm 810 defines a first bell-crank radius 816, and a second length of the second arm 820 defines a second bell-crank radius 826.

According to one implementation of the method 900, an input stroke length 130, 830 associated with the linear hydraulic slat actuator 104A, 104B is based on the first bell-crank radius 816, and an output stroke length 140, 840 associated with the actuator output link 108A, 108B, 108C is based on the second bell-crank radius 826.

According to one implementation of the method 900, the first bell-crank radius is similar to the second bell-crank radius. According to one implementation of the method 900, the first bell-crank radius 816 is different than the second bell-crank radius 826. As a non-limiting example, the second bell-crank radius 826 is greater than the first bell-crank radius 816. According to another example, the second bell-crank radius 826 can be smaller than the first bell-crank radius 816.

Thus, by using the bell-crank 106A, 106B, 800 to move the actuator output link 108A, 108B, 108C in a different direction (e.g., the chordwise 152, 452 direction) than the spanwise 150, 450 movement of the linear hydraulic slat actuator 104A, 104B, the linear hydraulic slat actuator 104A, 104B can be oriented in the spanwise 150, 450 direction along the aircraft wing 100, 400. As a result of the spanwise 150, 450 orientation, the linear hydraulic slat actuator 104A, 104B can achieve greater displacement within the aircraft wing 100, 400 while occupying less space in the movement direction of the slat 710 (e.g., the chordwise 152, 452 direction). Additionally, for a fixed displacement linear hydraulic slat actuator 104A, 104B, the output displacement of the actuator output link 108A, 108B, 108C, and thus the attached slat 710, can be tailored via arm lengths of the bell-crank 106A.

Although the systems are described herein with specific reference to aircraft systems or aerospace vehicles, in other embodiments, the system can be a vehicle other than an aircraft without departing from the essence of the present disclosure.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. An aircraft wing comprising:
   a support rib defining an aperture extending therethrough, the support rib having a first contour that is complimentarily shaped with respect to a second contour of a leading edge of the wing;
   a linear hydraulic slat actuator having at least a portion thereof extending through the aperture of the support rib, wherein the linear hydraulic slat actuator is oriented in a first direction, the first direction being spanwise along the aircraft wing;
   an actuator output link;
   a slat attached to the actuator output link; and
   a bell-crank rotatably coupled to: (i) the support rib, (ii) the linear hydraulic slat actuator and (iii) the actuator output link, wherein, in response to spanwise movement of the linear hydraulic slat actuator, the bell-crank is configured to move the actuator output link in a second direction different from the first direction that enables the slat to move between a retracted position and an extended position.

2. The aircraft wing of claim 1, wherein the bell-crank comprises:
   a first arm coupled to the linear hydraulic slat actuator, wherein a first length of the first arm defines a bell-crank radius; and
   a second arm coupled to the actuator output link, wherein a second length of the second arm defines a second bell-crank radius.

3. The aircraft wing of claim 2, wherein an input stroke length associated with the linear hydraulic slat actuator is based on the first bell-crank radius, and wherein an output stroke length associated with the actuator output link is based on the second bell-crank radius.

4. The aircraft wing of claim 2, wherein the first bell-crank radius is the same as the second bell-crank radius.

5. The aircraft wing of claim 2, wherein the first bell-crank radius is different than the second bell-crank radius.

6. The aircraft wing of claim 5, wherein the second bell-crank radius is greater than the first bell-crank radius.

7. The aircraft wing of claim 5, wherein the second bell-crank radius is smaller than the first bell-crank radius.

8. The aircraft wing of claim 1, wherein the support rib is further coupled to the linear hydraulic slat actuator.

9. The aircraft wing of claim 1, wherein the support rib, the linear hydraulic slat actuator, and the bell-crank are positioned within a compartment at the leading edge of the wing.

10. The aircraft wing of claim 1, wherein the first contour includes a first vertex that is positioned adjacent a second vertex of the second contour of the leading edge of the wing.

11. The aircraft wing of claim 1, wherein the support rib includes a portion having a curvature that matches the leading edge of the wing.

12. The aircraft wing of claim 1, wherein the first contour and the second contour are in contact with one another.

13. A method of fabricating an aircraft wing, the method comprising:

coupling a linear hydraulic slat actuator to a support rib defining an aperture extending therethrough, the support rib having a first contour that is complimentarily shaped with respect to a second contour of a leading edge of the wing, the linear hydraulic slat actuator having at least a portion thereof extending through the aperture of the support rib, wherein the hydraulic slat actuator is oriented in a first direction, wherein the first direction is spanwise along the aircraft wing;

rotatably coupling a bell-crank to the support rib;

rotatably coupling the bell-crank to the linear hydraulic slat actuator;

rotatably coupling an actuator output link to the bell-crank, the output link oriented in a second direction different from the first direction; and coupling a slat to the actuator output link, wherein, in response to spanwise movement of the linear hydraulic slat actuator, the bell-crank moves the actuator output link in the second direction that enables the slat to move between a retracted position and an extended position.

14. The method of claim 13, wherein the linear hydraulic slat actuator is coupled to a first arm of the bell-crank, and wherein the actuator output link is coupled to a second arm of the bell-crank, wherein a first length of the first arm defines a first bell-crank radius, and wherein a second length of the second arm defines a second bell-crank radius.

15. The method of claim 14, wherein an input stroke length associated with the linear hydraulic slat actuator is based on the first bell-crank radius, and wherein an output stroke length associated with the actuator output link is based on the second bell-crank radius.

16. The method of claim 14, wherein the first bell-crank radius is the same as the second bell-crank radius.

17. The method of claim 14, wherein the first bell-crank radius is different than the second bell-crank radius.

18. An aircraft comprising:

a fuselage; and an aircraft wing attached to the fuselage, the aircraft wing comprising:

a support rib defining an aperture extending therethrough, the support rib having a first contour that is complimentarily shaped with respect to a second contour of a leading edge of the wing;

a linear hydraulic slat actuator having at least a portion thereof extending through the aperture of the support rib, wherein the linear hydraulic slat actuator is oriented in a first direction, the first direction being spanwise along the aircraft wing;

an actuator output link;

a slat attached to the actuator output link; and a bell-crank rotatably coupled to: (i) the support rib, (ii) the linear hydraulic slat actuator and (iii) the actuator output link, wherein, in response to spanwise movement of the linear hydraulic slat actuator, the bell-crank is configured to move the actuator output link in the second direction different from the first direction that enables the slat to move between a retracted position and an extended position.

19. The aircraft of claim 18, wherein the bell-crank comprises:

a first arm coupled to the linear hydraulic slat actuator, wherein a first length of the first arm defines a first bell-crank radius; and a second arm coupled to the actuator output link, wherein a second length of the second arm defines a second bell-crank radius.

* * * * *